3,357,965
PREVENTION OF COLD FLOW IN ELASTOMERS
James N. Click, Bartlesville, Okla., assignor to Phillips Petroleum Company, a corporation of Delaware
No Drawing. Filed Nov. 30, 1964, Ser. No. 414,839
7 Claims. (Cl. 260—94.7)

ABSTRACT OF THE DISCLOSURE

Cold flow of unvulcanized rubbery polymers of conjugated dienes is reduced by contacting the polymer with a chlorine-containing bleaching agent.

---

This invention relates to a method for reducing the tendency of elastomers to cold flow in the unvulcanized state. In one aspect this invention relates to a method for treating a conjugated diene polymer to reduce its tendency to cold flow. In another aspect this invention relates to an elastomer having a reduced tendency to cold flow in the unvulcanized state.

In recent years a great deal of reseach work has been directed toward the production of improved rubbery polymers. Various catalyst systems have been developed that are capable of polymerizing monomers, particularly conjugated dienes, to a certain geometric configuration. One rubbery polymer which has attaracted wide spread attention because of its outstanding and superior properties is a polybutadiene containing a high percentage, e.g., at least 85 percent, of cis-1,4-addition. Another polymer product that has achieved considerable importance is one prepared by polymerizing a conjugated diene with a lithium based catalyst. The properties of these polymers are of such a nature that they are particularly suited for the fabrication of automobile and truck tires and other articles for which conventional synthetic polymers have heretofore been comparatively unsatisfactory. However, it has been found that certain of these polymers, including cis-polybutadiene and a conjugated diene polymer prepared with a lithium base catalyst, have a tendency to cold flow while in the unvulcanized state. Thus a certain amount of difficulty has been encountered in the processing of these polymers, particularly in their packaging, shipping, and storage. For example, if cracks or punctures develop in the packages used in storing, polymer will flow from the package with resulting product loss or contamination and sticking together of the stored packages.

It is an object of this invention to provide a method for reducing or substantially eliminating the tendency of elastomers to cold flow. Another object of this invention is to provide a method for treating cis-polybutadiene and conjugated diene polymers prepared with a lithium based catalyst so as to provide products in which the tendency to cold flow is substantially reduced. Another object of this invention is to provide an elastomer having a reduced tendency to cold flow in the unvulcanized state. Other objects, advantages and aspects will be apparent to those skilled in the art upon careful consideration of the accompanying disclosure and claims.

I have discovered that the tendency of elastomers to undergo cold flow in the unvulcanized state can be substantially reduced or eliminated by treating the elastomer with a bleaching agent. Broadly speaking, my invention resides in the discovery that the tendency of a rubbery polymer to undergo cold flow can be reduced to contacting it with a bleaching agent.

In conducting the process of this invention, the rubbery polymer to be treated is intimately contacted with a bleaching agent for a period of time of 5 seconds to 10 minutes. The intimate contacting can be conveniently carried out by dissolving the elastomer in any suitable solvent so as to produce a solution of the elastomer. Suitable solvents for the elastomers are well known in the art and include, for example, benzene, toluene, n-butane, isobutane, n-pentane, isooctane, n-dodecane, cyclopentane, cyclohexane, methylcyclohexane, and the like. After the elastomer has been dissolved in the solvent, the bleaching agent is added in a form whereby it is intimately contacted with the polymer solution. The bleaching agent can be conveniently dissolved in a solvent such as water and the aqueous solution of bleaching agent can be thoroughly mixed with the polymer solution by any mechanical means known in the art. It must be emphasized that the mixing step is such that the polymer solution is thoroughly contacted with the aqueous solution of bleaching agent. In some cases, the bleaching agent may be gaseous. Gaseous bleaching agents such as chlorine dioxide can be conveniently bubbled through the solution of polymer to thoroughly contact the bleaching agent with the polymer to be treated. It will be evident to those skilled in the art that different mechanical methods may be utilized to obtain the necessary contact between the bleaching agent and the polymer to be treated. Since many conventional polymerization processes utilize a diluent in which the final polymer product is dissolved, this invention can be conveniently carried out by treating the polymer solution with the bleaching agent after the polymerization has occured and after the catalyst system has been deactivated. In some cases it may be desirable to use an aqueous solution of the bleaching agent to inactivate the catalyst system upon completion of a polymerization process. In such cases the aqueous solution of bleaching agents serves a dual purpose. The aqueous solution inactivates the catalyst system and also improves the cold flow properties of the polymer. After the polymer solution has been treated with the bleaching agent, the polymer is recovered by any method known in the art such as by coagulation with alcohol, steam stripping and the like.

The bleaching agents that can be used in this invention are selected from the chlorine containing bleaching agents known in the art. Examples of such bleaching agents include chlorine dioxide and the chlorite and hypochlorites of the alkali of alkaline earth metals such as sodium hypochlorite, potassium chlorite, barium chlorite, calcium hypochlorite, and the like. By using bleaching agents to reduce the tendency of elastomers to cold flow, the added benefit of obtaining a white or colorless polymer is also obtained. Thus the polymers treated according to this invention are very useful in applications where color is undesirable, such as in white sidewall tires and other consumer good.

The amount of bleaching agent normally employed in the practice of this invention can vary over a wide range. For example, from 0.1 to 10 parts by weight bleaching agent per 100 parts by weight polymer to be treated can be utilized. The treating step can take place within a temperature range of from 50–150° F., but other temperatures can be used. The length of treatment of the polymer with the bleaching agent will vary according to the degree of efficiency of contacting the polymer and the bleaching agent. In some cases where mixing of the bleaching agent and the polymer is very efficient the mixing time can be as short as 5 seconds. In other cases, the mixing time can be as great as 10 minutes or more. After the treating has been completed, the polymer can be conveniently recovered from the solvent by any means known to the art such as by coagulation with alcohol, steam stripping, decantation, filtration, and the like.

The present invention is particularly applicable to rubbery polymers prepared by polymerizing a conjugated diene with a catalyst comprising an organometal compound, e.g., a catalyst which forms on mixing materials comprising an organometal and a heavy metal compound, or a lithium-based catalyst. These polymers can be defined as being polymers of conjugated dienes containing from 4–12, preferably from 4–8, carbon atoms per molecule. Examples of monomers that can be used in the preparation of the polymers include 1,3-butadiene, isoprene, piperylene, 2,3-dimethyl-1,3-butadiene, 1,3-octadiene, 4,5-diethyl-1,3-octadiene, 1,3-dodecadiene, 2,5-dimethyl-1,3-decadiene, and the like. These conjugated dienes can be polymerized to form homopolymers or mixtures of the dienes can be polymerized to form copolymers. Conjugated diene polymers can also be prepared by polymerizing the dienes with one or more copolymerizable vinyl-substituted aromatic hydrocarbons in which the vinyl group is attached to a nuclear carbon atom. It is to be understood that a compound having a substituent on the alpha carbon atom, such as alpha-methyl styrene, is not suitable for use in the preparation of the copolymers. Examples of vinyl-substituted aromatic hydrocarbons which are usually preferred in preparing the copolymers are styrene, 1-vinylnaphthalene and 3-methylstyrene (3-vinyltoluene). Examples of other compounds which can be advantageously utilized include 3,5-diethylstyrene,
4-n-propylstyrene,
2,4,6-trimethylstyrene,
4-dodecylstyrene,
3-methyl-5-n-hexylstyrene,
4-cyclohexylstyrene,
4-phenylstyrene,
2-ethyl-4-benzylstyrene,
4-p-tolylstyrene,
3,5-diphenylstyrene,
2,3,4,5-tetraethylstyrene,
3-(4-n-hexylphenyl)styrene,
3-ethyl-1-vinylnaphthalene,
6-isopropyl-1-vinylnaphthalene,
3,6-di-p-tolyl-1-vinylnaphthalene,
6-cyclohexyl-1-vinylnaphthalene,
8-phenyl-1-vinylnaphthalene,
7-dodecyl-2-vinylnaphthalene, and the like.

Further details on the preparation of rubbery diene polymers with organometal type catalysts are disclosed in U.S. Patent No. 2,979,488.

The present invention is particularly applicable to polybutadienes containing a high percentage of cis-1,4-addition. It is usually preferred that the cis-polybutadiene contain at least 85 percent cis-1,4-addition, e.g., 85 to 98 percent and higher. The cis-polybutadiene is prepared by polymerizing 1,3-butadiene with a large number of different stereospecific catalysts. Among the catalysts employed are those selected from the group consisting of (1) a catalyst which forms on mixing components comprising an organometal compound having the formula $R''_mM$, wherein $R''$ is alkyl, cycloalkyl, aryl, alkaryl, aralkyl, alkylcycloalkyl, arylcycloalky or cycloalkylalkyl, M is aluminum, mercury, zinc, beryllium, cadmium, sodium or potassium, and $m$ is equal to the valence of the metal M, and titanium tetraiodide, (2) a catalyst which forms on mixing components comprising an organometal compound having the formula $R''_nM'$, wherein $R''$ is an organo radical as defined above, M' is aluminum, magnesium, lead, sodium or potassium, and $n$ is equal to the valence of the metal M', titanium tetrachloride and titanium tetraiodide, (3) a catalyst which forms on mixing components comprising an organometal compound having the formula $R''_3Al$ or $R''_2Mg$, wherein $R''$ is an organo radical as defined above, a compound having the formula $TiX_a$, wherein X is chlorine or bromine and $a$ is an integer from 2–4, inclusive, and elemental iodine or an organic iodide, (4) a catalyst which forms on mixing components comprising an organometal compound having the formula $R''_xM'''$, wherein $R''$ is an organo radical as defined above, $M'''$ is aluminum, gallium, indium or thallium, and $x$ is equal to the valence of the metal $M''$, a titanium halide having the formula $TiX_4$, wherein X is chlorine or bromine, and an inorganic halide having the formula $M'''I_b$, wherein $M'''$ is beryllium, zinc, cadmium, aluminum, gallium, indium, thallium, silicon, germanium, tin, lead, phosphorus, antimony, arsenic, and bismuth, and $b$ is an integer from 2–5, inclusive, and (5) a catalyst which forms on mixing components comprising an organo compound having the formula $R''_xM''$, wherein $R''$, $M''$ and X are defined above, titanium tetraiodide, and an inorganic halide having the formula $M^{iv}X_c$, wherein $M^{iv}$ is aluminum, gallium, indium, thallium, germanium, tin, lead, phosphorus, antimony, arsenic and bismuth, X is chlorine or bromine, and $c$ is an integer from 2–5, inclusive. The $R''$ radicals of the aforementioned formulas preferably contain up to and including 20 carbon atoms.

The following are examples of preferred catalyst systems which can be used to polymerize 1,3-butadiene to a cis-1-4-polybutadiene:

Triisobutylaluminum and titanium tetraiodide,
Triethylaluminum and titanium tetraiodide,
Triisobutylaluminum, titanium tetrachloride and titanium tetraiodide,
Triethylaluminum, titanium tetrachloride and titanium tetraiodide,
Diethylzinc and titanium tetraiodide,
Dibutylmercury and titanium tetraiodide,
Triisobutylalumium, titanium tetrachloride and iodine,
Triethylaluminum, titanium tetrabromine and iodine,
n-Amylsodium and titanium tetraiodide,
Phenylsodium and titanium tetraiodide,
n-Butylpotassium and titanium tetraiodide,
Phenyylpotassium and titanium tetraiodide,
n-Amylsodium, titanium tetrachloride and titanium tetraiodide,
Triphenylaluminum and titanium tetraiodide,
Triphenylaluminum, titanium tetraiodide and titanium tetrachloride,
Triphenylaluminum, titanium tetrachloride and iodine,
Tri-alpha-naphthylaluminum, titanium tetrachloride and iodine,
Tribenzylaluminum, titanium tetrabromide and iodine,
Diphenylzinc and titanium tetraiodide,
Di-2-tolylmercury and titanium tetraiodide,
Tricyclohexylaluminum, titanium tetrachloride and titanium tetraiodide,
Ethylcyclopentylzinc and titanium tetraiodide,
Tri(3-isobutylcyclohexyl)aluminum and titanium tetraiodide,
Tetraethyllead, titanium tetrachloride and titanium tetraiodide,
Dimethylphenyllead, titanium tetrachloride and titanium tetraiodide,
Diphenylmagnesium and titanium tetraiodide,
Di-n-propylmagnesium, titanium tetrachloride and titanium tetraiodide,
Dimethylmagnesium, titanium tetrachloride and iodine,
Diphenylmagnesium, titanium tetrabromide and iodine,
Methylethylmagnesium and titanium tetraiodide,
Dibutylberyllium and titanium tetraiodide,
Diethylcadmium and titanium tetraiodide,
Diisopropylcadmium and titanium tetraiodide,
Triisobutylaluminum, titaniumtetrachloride and 1,4-diiodo-2-butene,
Triethylaluminum, titanium tetrabromide and isobutyliodide,
Di-n-propylmagnesium, titanium tetrachloride and methyl iodide,
Triisobutylaluminum, titanium tetrachloride and iodoform,
Triisobutylaluminum, titanium tetrachloride and antimony triiodide,
Triisobutylaluminum, titanium tetrachloride and aluminum triiodide, Triisobutylaluminum, titanium tetrabromide and aluminum triiodide,
Triethylaluminum, titanium tetrachloride and phosphorus triiodide,
Tri-n-dodecylaluminum, titanium tetrachloride and tin tetraiodide,
Triethylgallium, titanium tetrabromide and aluminum triiodide,
Tri-n-butylaluminum, titanium tetrachloride and antimony triiodide,
Tricyclopentylaluminum, titanium tetrachloride and silicon tetraiodide,
Triphenylaluminum, titanium tetrachloride and gallium triiodide,
Triisobutylaluminum, titanium tetraiodide and tin tetrachloride,
Triisobutylaluminum, titanium tetraiodide and antimony trichloride,
Triisobutylaluminum, titanium tetraiodide and aluminum trichloride,
Triisobutylaluminum, titanium tetraiodide and tin tetrabromide,
Triethylgallium, titanium tetraiodide and aluminum tribromide,
Triethylaluminum, titanium tetraiodide and arsenic trichloride,
Tribenzylaluminum, titanium tetraiodide and germanium tetrachloride.

The polymerization process for preparing cis-polybutadiene is carried out in the presence of a hydrocarbon diluent which is not deleterious to the catalyst system. Examples of suitable diluents include aromatic, paraffinic, and cycloparaffinic hydrocarbons, it being understood that mixtures of these materials can also be used. Specific examples of hydrocarbon diluents include benzene, toluene, n-butane, isobutane, n-pentane, isooctane, n-dodecane, cyclopentane, cyclohexane, methylcyclohexane, and the like. It is often preferred to employ aromatic hydrocarbons as the diluent.

The amount of the catalyst used in preparing the cis-polybutadiene product can vary over a rather wide range. The amount of the organometal used in the catalyst composition is usually in the range of 1.0 to 20 mols per mol of the halogen-containing catalyst component, i.e., a metal halide with or without a second metal halide or elemental iodine. However, a preferred mol ratio is from 2.5:1 to 12:1 of the organometal compound to the halogen-containing component. When using a catalyst comprising an organometal compound and more than one metal halide, e.g., titanium tetrachloride and titanium tetraiodide, titanium tetrachloride or tetrabromide and aluminum iodide, the mol ratio of the tetrachloride or tetrabromide to the iodide is usually in the range of 0.5:1 to 5:1. With a catalyst system comprising an organometal compound, a titanium chloride or bromide and elemental iodine, the mol ratio of titanium halide to iodine is generally in the range of 10:1 to 0.25:1, preferably 3:1 to 0.25:1. The concentration of the total catalyst composition, i.e., organometal and halogen-containing catalyst component, is usually in the range of 0.01 to 10 weight percent, preferably in the range of 0.01 to 5 weight percent, based on the total amount of 1,3-butadiene charged to the reactor system.

The process for preparing cis-polybutadiene can be carried out at temperatures varying over a rather wide range, e.g., from −100 to 250° F. It is usually preferred to operate at a temperature in the range of −30 to 160° F. The polymerization reaction can be carried out under autogenous pressure or at any suitable pressure sufficient to maintain the reaction mixture substantially in the liquid phase. The pressure will thus depend upon the particular diluent employed and the temperature at which the polymerization is conducted. However, higher pressures can be employed, if desired, these pressures being obtained by some such suitable method as the pressurization of the reactor with a gas which is inert with respect to the polymerization reaction.

The present invention is also especially applicable to the treatment of rubbery polymers prepared by polymerizing a conjugated diene with lithium metal and/or an organolithium compound. The method of this invention is particularly applicable to the treatment of polybutadienes prepared with a lithium based catalyst. These polybutadienes generally contain from 35 to 48 percent cis, 1,4-addition, from 45 to 55 percent trans 1,4-addition and from 6 to 10 percent 1,2-addition. Polybutadienes prepared by this method and having an inherent viscosity in the range of 0.75 to 3 can be advantageously treated in accordance with the present method. While such low inherent viscosity polybutadienes possess outstanding properties, they have a tendency to cold flow when in the unvulcanized state.

Organolithium compounds suitable for use in the polymerization have the formula $RLi_x$, wherein R is a hydrocarbon radical selected from the group consisting of aliphatic, cycloaliphatic and aromatic radicals and $x$ is an integer from 1–4, inclusive. The R in the formula has a valence equal to the integer and preferably contains from 1–20, inclusive, carbon atoms, although higher molecular weight compounds can be utilized. In preparing the polybutadiene, it is often preferred to use an alkyllithium compound, such as n-butyllithium, as the catalyst. Examples of other suitable organolithium compounds include Methyllithium,
Isopropyllithium,
Tert-octyllithium,
n-Decyllithium,
Phenyllithium,
Naphthyllithium,
4-butylphenyllithium,
p-Tolyllithium,
4-phenylbutyllithium,
Cyclohexyllithium,
4-butylcyclohexyllithium,
4-cyclohexylbutyllithium,
Dilithiomethane,
1,4-dilithiobutane,
1,10-dilithiodecane,
1,20-dilithioeicosane,
1,4-dilithiocyclohexane,
1,4-dilithio-2-butene,
1,8-dilithio-3-decene,
1,4-dilithiobenzene,
1,5-dilithionaphthalene,
1,2-dilithio-1,2-diphenylethane,
9,10-dilithio-9,10-dihydroanthracene,
1,2-dilithio-1,8-diphenyloctane,
1,3,5-trilithiopentane,
1,5,15-trilithioeicosane,
1,3,5-trilithiocyclohexane,
1,2,5-trilithionaphthalene,
1,3,5-trilithioanthracene,
1,3,5,8-tetralithiodecane,
1,5,10,20-tetralithioeicosane,
1,2,3,5-tetralithiocyclohexane,
1,2,3,5-tetralithio-4-hexylanthracene,
and the like.

The process used in preparing the conjugated diene polymers with a lithium based catalyst can be conducted at a temperature in the range of −100 to 250° F., preferably at a temperature in the range of 0 to 180° F. The polymerization reaction can be carried out under autogenous pressures. It is usually desirable to operate at a pressure sufficient to maintain the reaction mixture in the liquid phase. The polymerization is conducted in the presence of a hydrocarbon diluent similar to that employed in the polymerization process as described hereinbefore. The actual pressure used in the process will depend upon the particular diluent employed and the temperature at which the polymerization is to be conducted.

A conjugated diene polymer having a desired inherent viscosity can be readily prepared by varying the concentration of the lithium based catalyst. For example, with a completely dry system and no other impurities present to destroy the organolithium compound, about 2.5 millimoles of catalyst per 100 grams of monomer is generally required to give a polymer having an inherent viscosity of 0.75, and about 0.30 millimole of catalyst per 100 grams of monomer is generally required for the production of a polymer having an inherent viscosity of 3.0. It has been found that for practical operations approximately 0.3 or more millimole of catalyst per 100 grams of monomer is frequently needed as a scavenger for the system.

The present invention is also applicable to the treatment of copolymers that have been prepared in the presence of an organolithium catalyst. These copolymers are prepared by contacting at least two monomers selected from the group consisting of 1,3-butadiene, isoprene, piperylene, vinyl-substituted aromatic hydrocarbons, vinyl halides, vinylidene halides, esters of acrylic acids and esters of homologs of acrylic acids with an organolithium compound in the presence of a solvent mixture comprising (1) a hydrocarbon selected from the group consisting of aromatic hydrocarbons, paraffins and cycloparaffins, and (2) a polar organic compound, such as an ether, thioether, or tertiary amine. The details for preparing such copolymers are disclosed in U.S. Patent No. 2,975,160.

Various materials are known to be detrimental to the catalyst employed in preparing the rubbery polymers. These materials include carbon dioxide, oxygen and water. It is usually desirable, therefore, that the butadiene and the diluent be freed of these materials as well as other materials which may tend to inactivate the catalyst. Furthermore, it is desirable to remove air and moisture from the reaction vessel in which the polymerization is to be conducted. Upon completion of the polymerization reaction, the reaction mixture is then treated to inactivate the catalyst. The rubbery polymer is then treated with the bleaching agent to reduce its tendency to cold flow. After the treatment with the bleaching agent, the polymer is recovered. A suitable method for accomplishing this result involves steam stripping the diluent from the polymer. In another suitable method, a catalyst inactivating material, such as an alcohol, is added to the mixture so as to inactivate the catalyst and cause precipitation of the polymer. A mixture of fatty acids can also be used to inactivate the catalyst system. The polymer is then separated from the alcohol and diluent by any suitable means, such as decantation or filtration. It has been found to be advantageous to add an antioxidant, such as phenyl-beta-naphthylamine, 2,6-di-tert-butyl-4-methylphenol or 2,2'-methylene-bis-(4-methyl-6-tert-butylphenol) to the polymer solution prior to recovery of the polymer.

A more comprehensive understanding of the invention can be obtained by referring to the following illustrative examples, which are not intended, however, to be unduly limitative of the invention.

EXAMPLE I

A low cis-polybutadiene was prepared by using the following recipe:

| | Parts by weight |
|---|---|
| 1,3-butadiene | 100 |
| n-Hexane | 800 |
| n-Butyllithium | 0.089 |

The reaction was initiated at 125° F. and the temperature rose to 182° F. during the polymerization. The time of the polymerization reaction was 45 minutes. At the end of the reaction period the catalyst system was inactivated by the addition of 1 part by weight per 100 parts by weight of butadiene charged of a mixture of $C_{16}$ to $C_{18}$ saturated and unsaturated fatty acids. One part by weight per 100 parts of butadiene charged of 2,6-di-tert-butyl-4-methylphenol was added as an antioxidant. A portion of the polymer solution was withdrawn and the polymer was separated by coagulation with isopropyl alcohol and filtration. The coagulated polymer was then dried and used as a control for cold flow determination. The remaining solution of polymer was contacted with an aqueous solution of sodium hypochlorite. The aqueous solution contained 5.25 percent sodium hypochlorite. The amount of sodium hypochlorite used in treating the polymer was 1 part by weight of sodium hypochlorite per 100 parts of polymer. The solution of polymer and the aqueous solution of sodium hypochlorite were vigorously agitated for 15 seconds. Upon the completion of the agitation, the polymer was separated by coagulation with isopropyl alcohol and filtration. The polymer was then dried and cold flow was determined. The data of Table I show the drastic reduction in cold flow of the treated polymer over that of the cold flow of the untreated polymer.

TABLE I

| Polymer | Sodium Hypochlorite, phr.[1] | Cold Flow, mg./min.[2] |
|---|---|---|
| Butadiene | 0 | 12.0 |
| Do | 1 | 2.4 |

[1] Parts by weight per 100 parts by weight of rubber.
[2] Cold flow was measured by extruding the rubber through a ¼ inch orifice at 3.5 p.s.i. pressure and a temperature of 50° C. (122° F). After allowing 10 minutes to reach steady state, the rate of extrusion was measured and reported in milligrams per minute.

EXAMPLE II

A high cis-polybutadiene was prepared using the following recipe:

| | Parts by weight |
|---|---|
| 1,3-butadiene | 100 |
| Toluene | 885 |
| Triisobutylaluminum | 0.583 |
| Iodine | 0.106 |
| Titanium tetrachloride | 0.0452 |

The reaction was initiated at 40° F. and the temperature was allowed to rise to about 70° F. The reaction time was 37.4 minutes. Upon completion of the reaction, 0.5 part per 100 parts of butadiene charged of 2,2'-methylene-bis(4-methyl-6-tert-butylphenol) antioxidant was added to the polymer solution and 2.0 parts per 100 parts of butadiene charged of Nilox S (disproportionated resin) was addeed to inactivate the catalyst system. A portion of the polymer solution was withdrawn and the polymer was coagulated with isopropyl alcohol. The coagulated polymer was separated by filtration and dried and used as a control sample in cold flow determination. The remaining solution of polymer was contacted with a 5.25 percent aqueous solution of sodium hypochlorite. One part by weight of sodium hypochlorite per 100 parts of polymer was used. The aqueous solution of sodium hypochlorite in the polymer solution were vigorously agitated for 15 seconds. After the agitation the polymer was coagulated with isopropyl alcohol. The coagulated polymer was separated by filtration and dried. The polymer was then subjected to tests to determine its tendency to cold flow. The data of Table II illustrate how the tendency of the polymer to cold flow was eliminated when compared with the polymer that was not treated with sodium hypochlorite.

TABLE II

| Polymer | Sodium Hypochlorite, phr.[1] | Cold Flow, mg./min[2]. |
|---|---|---|
| Cis-polybutadiene | 0 | 1.0 |
| Do | 1 | 0 |

[1] Described in Example I.
[2] Described in Example I.

It will be apparent to those skilled in the art that various modifications of the present invention can be made in view of the foregoing disclosure. Such modifications and variations are believed to be within the scope and spirit of the invention.

I claim:

1. A method for reducing the tendency of a rubbery essentially hydrocarbon unsaturated polymer of a conjugated diene to cold flow when in the unvulcanized state which comprises contacting said polymer with a chlorine-containing bleaching agent, selected from the group consisting of chlorine dioxide, chlorites of alkali metals, chlorites of alkaline earth metals, hypochlorites of alkali metals and hypochlorites of alkaline earth metals.

2. A method for reducing the tendency of a rubbery essentially hydrocarbon unsaturated polymer of a conjugated diene to cold flow when in the unvulcanized state which comprises the steps of dissolving said polymer in a solvent and contacting the polymer solution with a chlorine containing bleaching agent for a period of time from 5 seconds to 10 minutes at a temperature in the range of from 50° to 150° F., said bleaching agent being selected from the group consisting of chlorine dioxide, chlorites of alkali metals, chlorites of alkaline earth metals, hypochlorites of alkali metals and hypochlorites of alkaline earth metals.

3. The method of claim 2 in which from 0.1 to 10 parts by weight of bleaching agent is added per 100 parts by weight of rubbery polymer.

4. A method for reducing the tendency of polybutadiene to cold flow when in the unvulcanized state which comprises the steps of dissolving said polybutadiene in a solvent and contacting the polybutadiene solution with from 0.5 to 5 parts by weight of a chlorine containing bleaching agent for 5 seconds to 10 minutes at a temperature of from 50° to 150° F., said bleaching agent being selected from the group consisting of chlorine dioxide, chlorites of alkali metals, chlorites of alkaline earth metals, hypochlorites of alkali metals and hypochlorites of alkaline earth metals.

5. The method of claim 4 where the bleaching agent is sodium hypochlorite in an aqueous solution.

6. A method for reducing the tendency of a rubbery essentially hydrocarbon unsaturated polymer of a conjugated diene to cold flow when in the unvulcanized state which comprises the steps of dissolving said polymer in a solvent and contacting the polymer solution with an aqueous solution of a bleaching agent selected from the group consisting of alkali metal hypochlorites and alkaline earth metal hypochlorites.

7. The method of claim 1 wherein said bleaching agent is sodium hypochlorite.

References Cited
UNITED STATES PATENTS 2,376,027 5/1945 Bouchard _____ 260—94.7
3,238,187 3/1966 Kraus et al. _____ 260—94.7

JOSEPH L. SCHOFER, *Primary Examiner.*

N. HAMROCK, H. I. CANTOR, *Assistant Examiners.*